US011841168B2

(12) United States Patent
    Conor

(10) Patent No.: US 11,841,168 B2
(45) Date of Patent: Dec. 12, 2023

(54) WALL MOUNTABLE ELECTRIC HEATER WITH SLIM FORM FACTOR

(71) Applicant: Trust Electric Heating Limited, Leeds (GB)

(72) Inventor: Scott Conor, Leeds (GB)

(73) Assignee: TRUST ELECTRIC HEATING LIMITED, Leeds (GB)

(*) Notice: Subject to any disclaimer, the term of this patent is extended or adjusted under 35 U.S.C. 154(b) by 722 days.

(21) Appl. No.: 16/982,144

(22) PCT Filed: Mar. 19, 2019

(86) PCT No.: PCT/GB2019/050762
§ 371 (c)(1),
(2) Date: Sep. 18, 2020

(87) PCT Pub. No.: WO2019/180418
PCT Pub. Date: Sep. 26, 2019

(65) Prior Publication Data
US 2021/0372663 A1 Dec. 2, 2021

(30) Foreign Application Priority Data
Mar. 19, 2018 (GB) .................................. 1804373

(51) Int. Cl.
*F24H 7/04* (2006.01)
(52) U.S. Cl.
CPC ................ *F24H 7/0416* (2013.01)
(58) Field of Classification Search
CPC .... F24H 7/0416; F24H 7/0408; F24H 7/0425; F24H 7/045; F24H 7/0458; F24H 7/06;
(Continued)

(56) References Cited

U.S. PATENT DOCUMENTS

2020/0191413 A1* 6/2020 Faotto .................... F24D 3/144

FOREIGN PATENT DOCUMENTS

DE   1579786     8/1970
DE   3636740 A1  5/1988
(Continued)

OTHER PUBLICATIONS

British Search Report for corresponding application 1804373.7; Report dated Aug. 29, 2018.
(Continued)

*Primary Examiner* — Shawntina T Fuqua
(74) *Attorney, Agent, or Firm* — CANTOR COLBURN LLP

(57) ABSTRACT

A wall mountable electric heater comprises a core 20 arranged in a casing 2 with a convection space 50 defined between opposed surfaces 47, 27' of the casing and the core. The opposed surfaces are provided with oppositely directed protrusions 26, 44 which are spaced apart in two dimensions and arranged in-between one another to form a serpentine flowpath. The protrusions 44 in the panel 4 of the casing define recesses 43 which extend inwardly towards the core, each recess having a base wall 46 in which a perforation 48 is formed between the first and second sides 40, 41 of the panel 4, The air flowing upwardly through the convection space 50 generates a pressure differential across the first and second sides 40, 41 of the panel 4, drawing air in through the perforations 48 to increase the mass flow rate of the air in the convection space. The base wall 46 of each recess may be spaced apart from the opposed, outwardly facing side 23 of the core by a relatively small distance D1, increasing the velocity of the airflow and hence the pressure differential proximate the perforation 48.

9 Claims, 7 Drawing Sheets

(58) Field of Classification Search
CPC ... F24H 7/062; F24H 7/04; F24H 7/02; F24H 7/00; F24H 7/0208; F24H 7/0216; F24H 7/0225; F24H 7/0258; Y02B 30/00
See application file for complete search history.

(56) References Cited

FOREIGN PATENT DOCUMENTS

| | | | |
|---|---|---|---|
| EP | 0344341 A1 | 12/1989 | |
| EP | 1128134 A1 | 8/2001 | |
| ES | 2938066 T3 * | 4/2023 | ............. E04B 1/762 |
| GB | 2265705 A | 10/1993 | |
| KR | 102482688 B1 * | 12/2022 | |

OTHER PUBLICATIONS

International Search Report for corresponding application PCT/GB2019/050762 filed Mar. 19, 2019; dated Jul. 10, 2019.

* cited by examiner

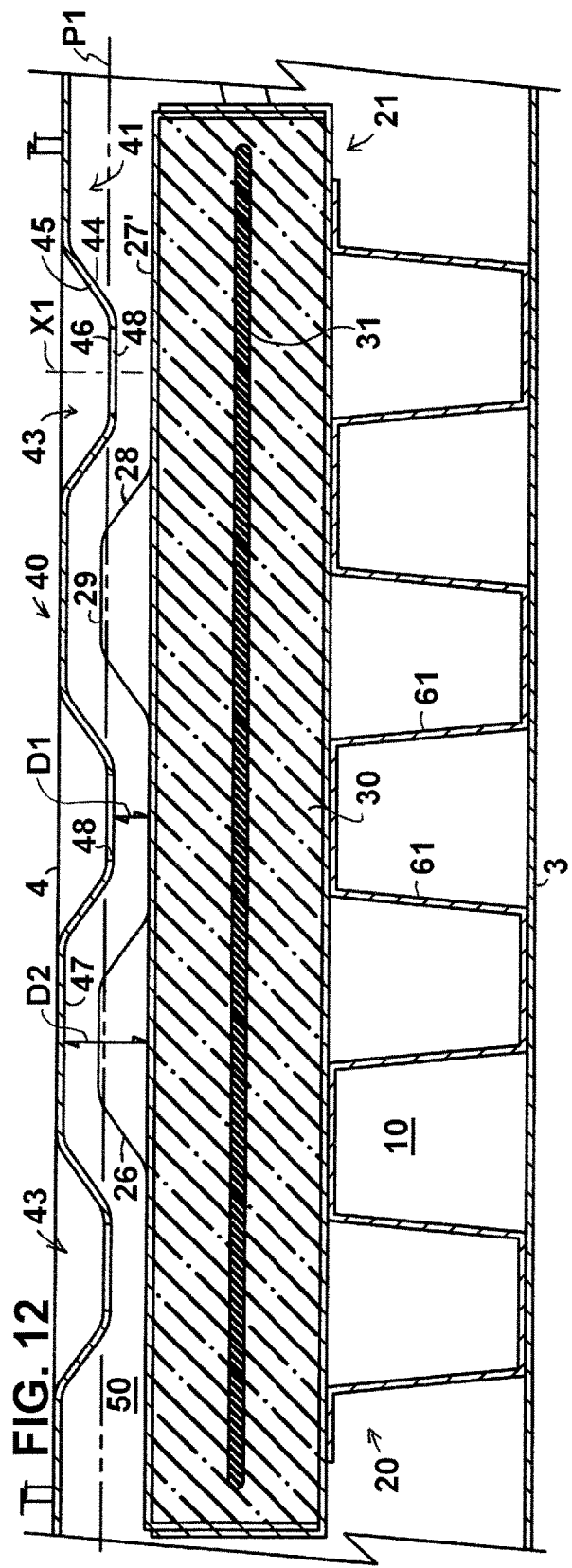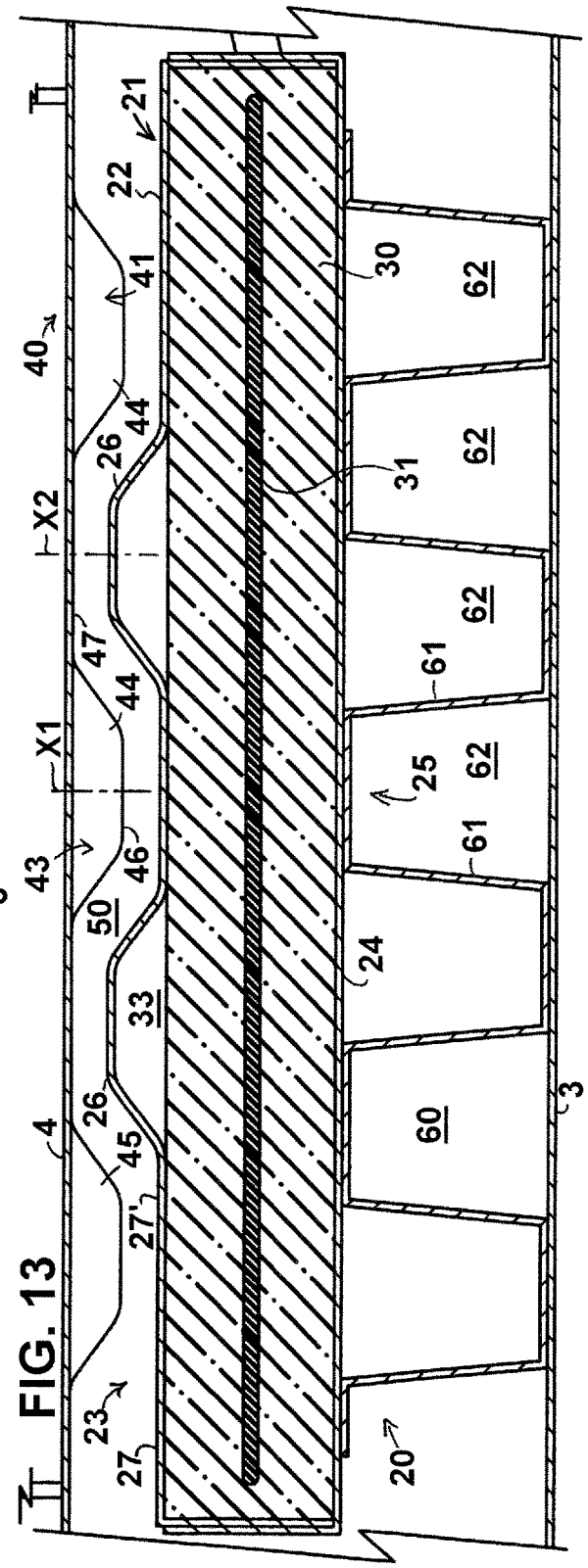

WALL MOUNTABLE ELECTRIC HEATER WITH SLIM FORM FACTOR

This invention relates to wall mounted electric heaters of the type comprising a thermal mass, for example, a block of soapstone, heated by an electric element.

The thermal mass absorbs heat from the electric element and emits the heat at a comfortable temperature by radiation and/or convection. Such heaters may be arranged to store heat energy at night and then emit it during the day, or with a smaller thermal mass to emit the stored heat over a much shorter cycle time so that the element is energised intermittently while the heater is in use.

Typically the thermal mass is arranged as a core within an outer casing which is mounted on a wall of the room into which the heat is emitted. It is desirable for the whole assembly to be as slim as possible so as not to obstruct the room; however, the casing must accommodate a convector structure which generates enough airflow to transfer the convective heat output into the room.

It is a general object of the present invention to provide an electric heater with an effective convector structure in a slim form factor.

According to the present invention there is provided a wall mountable electric heater as defined in the claims.

The novel heater comprises a casing and a core arranged in the casing. The casing includes a panel with opposite, first and second sides. The core includes a first outward side, a thermal mass, and an electric element arranged to heat the thermal mass. Respective surfaces of the second side of the panel and the first outward side of the core are spaced apart in opposed relation on opposite sides of a nominal convection plane lying in a convection space between the panel and the core.

The first outward side of the core has a plurality of first protrusions which are spaced apart in two dimensions to form a spaced array. The panel has a plurality of recesses which are spaced apart in two dimensions to form a spaced array on the first side of the panel, each recess extending along a recess axis towards the first outward side of the core to define a second protrusion on the second side of the panel.

Each recess has a recess sidewall and a recess base wall. The recess sidewall surrounds the recess axis and extends towards the first outward side of the core and terminates at the recess base wall. The recess base wall is spaced apart from the first outward side of the core by a separation distance D1.

When the first and second protrusions are projected onto the convection plane, the first protrusions are arranged in-between the second protrusions in the convection plane so that the convection space defines a serpentine flowpath between respective adjacent ones of the first and second protrusions. A perforation is formed in each recess base wall between the first and second sides of the panel.

As air flows upwards through the convection space between the recess base wall and the first outward side of the core, its velocity generates a pressure differential across the first and second sides of the panel so that air is drawn in through the perforations, increasing the mass flow rate of air within the convection space. The serpentine flowpath increases heat transfer into the air flowing over the core. A relatively small separation distance D1 increases the differential velocity of the airflow so that more effective convective heat transfer is obtained in a slim form factor.

Further features and advantages will be appreciated from the following illustrative embodiment of the invention which will now be described, purely by way of example and without limitation to the scope of the claims, and with reference to the accompanying drawings, in which:

FIG. 12 is an enlarged view of the central region of FIG. 10; and

FIG. 13 is another horizontal section through the central region of the heater taken just below the view of FIG. 12 at XIII-XIII of FIG. 7.

Figure 2:
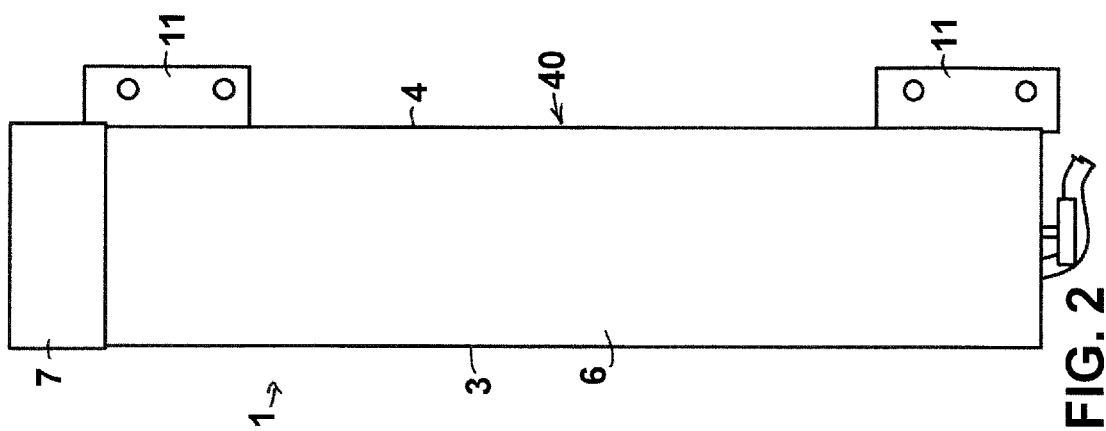
FIGS. 1, 2, 3 and 4 are respectively a front, side, back and top view of a wall mountable electric heater in accordance with an embodiment of the invention.
Figure 1:
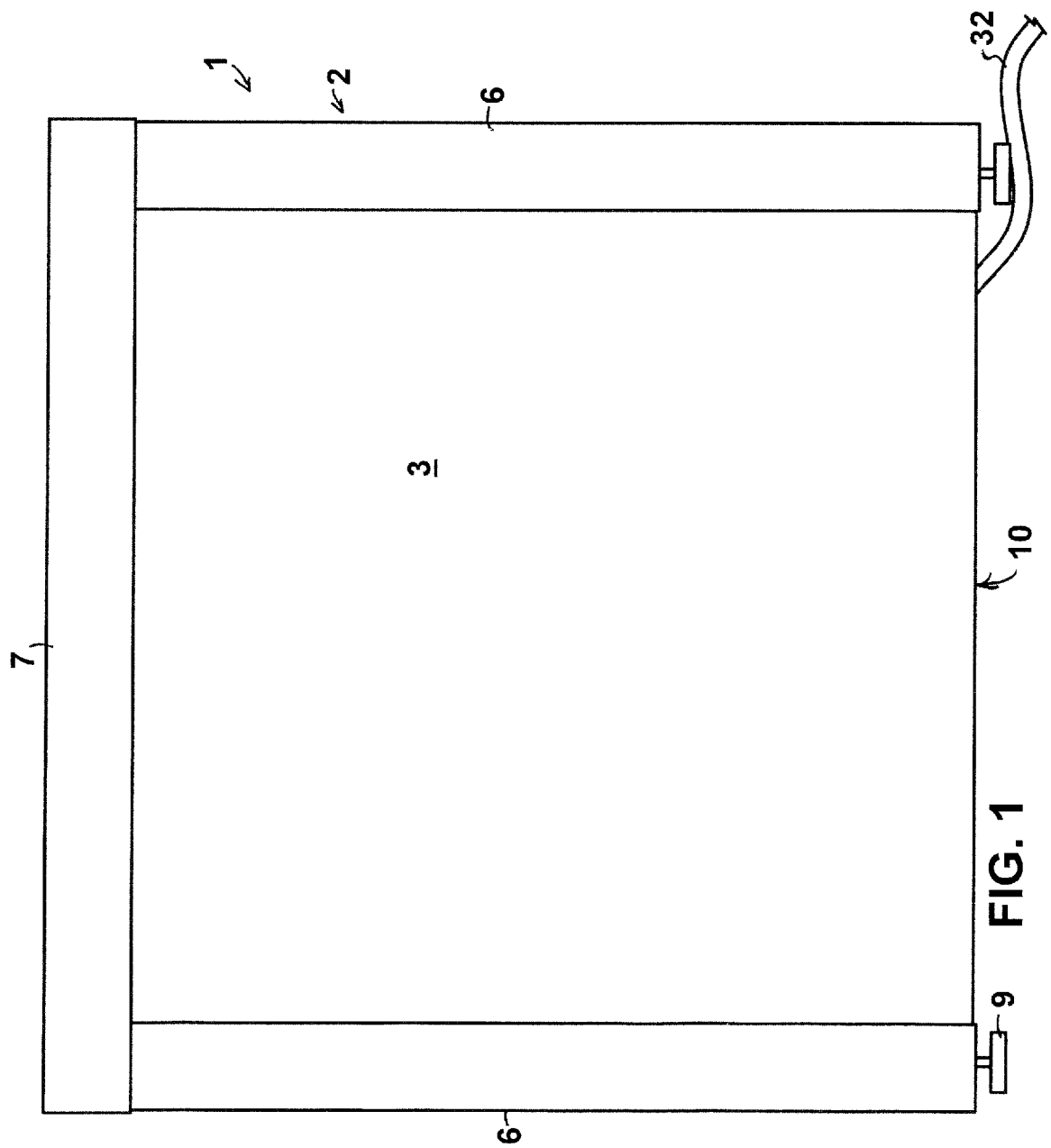

Reference numerals and characters appearing in more than one of the figures indicate the same or corresponding features in each of them.

Figure 11:
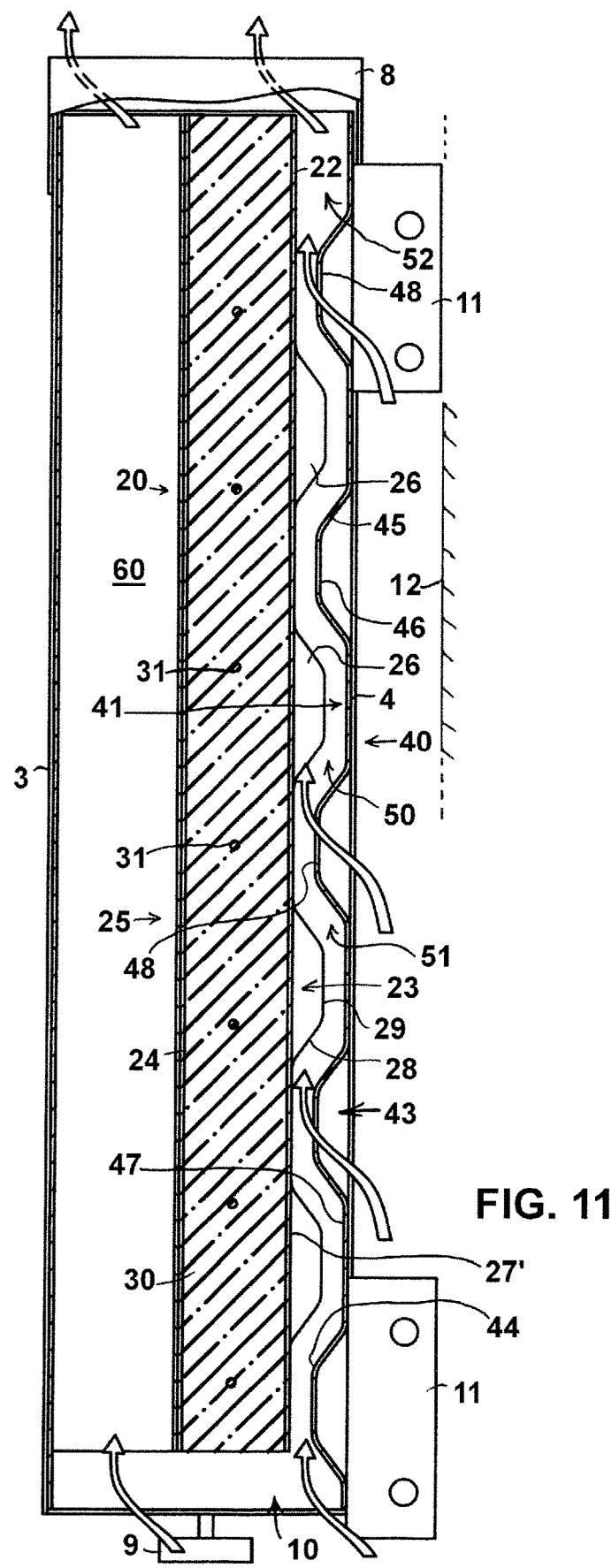
FIG. 11 is an enlarged view of FIG. 8 showing how air is drawn in through the perforations.

Referring to the figures, the heater or radiator 1 comprises a casing 2 and a core 20 arranged inside the casing. The casing 2 may be made from sheet metal, advantageously sheet aluminium, comprising a front panel 3 which defines the front side of the heater, and a rear panel 4 which defines a rear surface of the casing. The front and rear panels may be joined by internal sides 5 which are covered by end covers 6. A top cover 7 with air vents 8 is arranged over the top of the vertical panels. The casing is provided with feet 9 which support the lower end of the casing above the level of the floor, the lower end defining an opening 10 through which air can flow into the casing at the base. The casing also has supports 11 which are used with suitable brackets or other wall fixings (not shown) as known in the art to support the heater on a wall 12 with the rear surface in spaced parallel relation to the wall as shown in FIG. 11.

As best seen in FIGS. 12 and 13, the core 20 may comprise a casing 21, which may be made for example from aluminium or other sheet metal, having a rear part 22 which defines a first, rearwardly facing outward side 23 of the core, and a front part 24 which defines a second, frontwardly facing outward side 25 opposite the first outward side. The first and second parts may be formed as two shallow trays with fit together with their sidewalls in overlapping relation to form a shell which encloses the thermal mass 30 between the front and rear sides 25, 23.

The thermal mass 30 may comprise any suitable material that can store heat and release it at a comfortable temperature, for example, a compressed block of mineral powder such as soapstone, An electric element 31 is arranged to heat the thermal mass 30, conveniently by embedding the element inside the block. A power conductor 32 is arranged in communication with suitable thermostatic controls or other temperature sensing and control means (not shown) as known in the art for sensing the temperature of the core and/or the temperature of the air in the room to energise the element and control the temperature of the core so as to emit heat at a comfortable temperature by radiation and convection through the casing.

Figure 5:
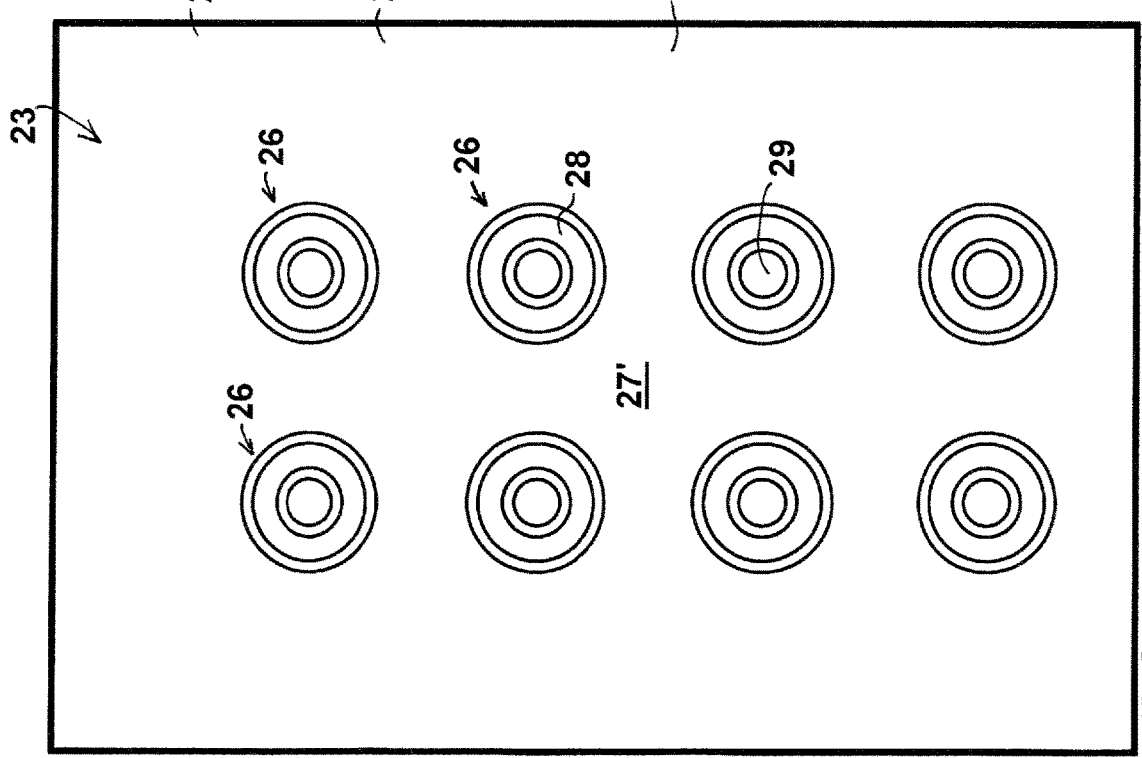

The rearwardly facing outward side 23 of the core defines a plurality of first protrusions 26 which are spaced apart in two (respectively, vertical and horizontal) dimensions to form a spaced array as shown in FIG. 5. The first protrusions may be formed as locally indented regions of a generally flat sheet metal panel 27 forming the major surface of the rear part 22 of the casing. Each first protrusion may extend outwardly from the flat surface 27' of the panel 27 as shown along an axis X2 to define a frustoconical sidewall 28 defining a surface of revolution about the axis X2 with a flat top surface 29 normal to the axis X2 and so parallel with the convection plane P1 and the flat surface 27' of the panel 27. The two dimensions defining the spaced array extend in the major flat surface plane 27' of the panel 27 parallel with the convection plane P1, hence in the plane of the drawing as shown in FIG. 5.

The thermal mass 30 may be arranged as shown in the sheet metal casing 21 in contact with regions of the sheet metal panel 27 defining on its outward side 23 its flat surface 27' proximate the first protrusions 26, a void 33 being formed between the thermal mass 30 and each of the first protrusions 26 as shown. Despite the presence of the void 33, the intimate contact between the flat portion of the panel 27 and the thermal mass 30 is found to effectively transfer heat to the first protrusions 26 and hence to the air which impinges on the first protrusions as it flows through the convection space 50. The heat transfer from the core to the first protrusions is particularly effective when the panel 27 is made from aluminium, providing an effective but economical construction which makes it possible to form the thermal mass 30 by pressing as a simple, rectilinear block.

Figure 3:
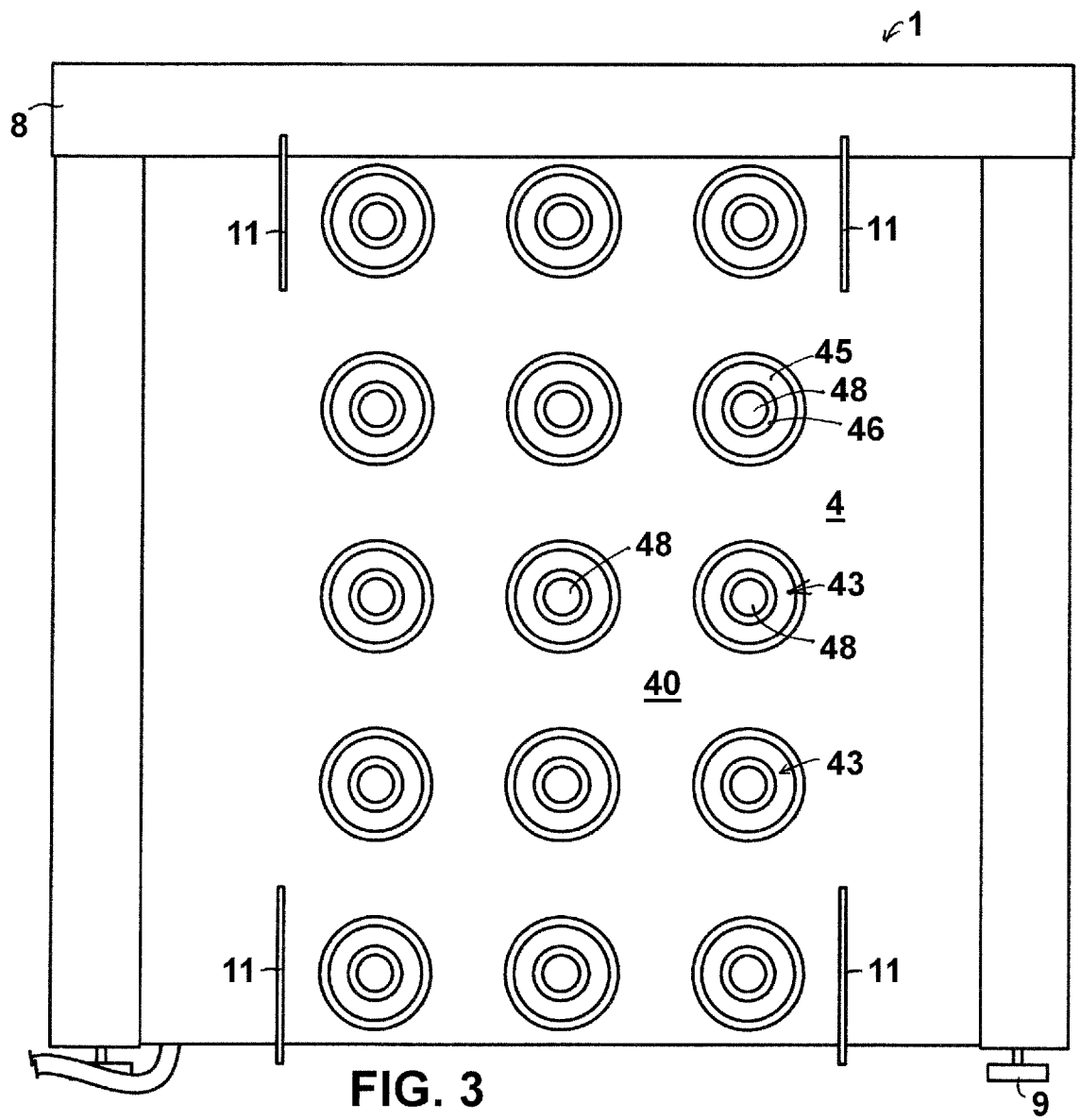
Figure 4:
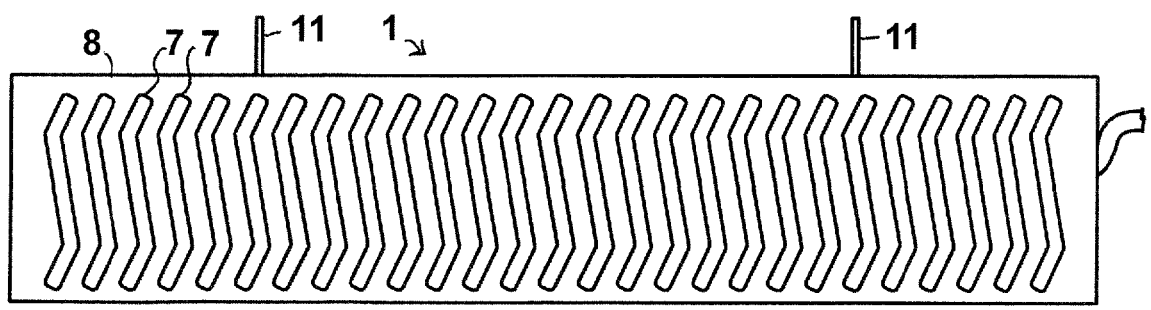
Figure 6:
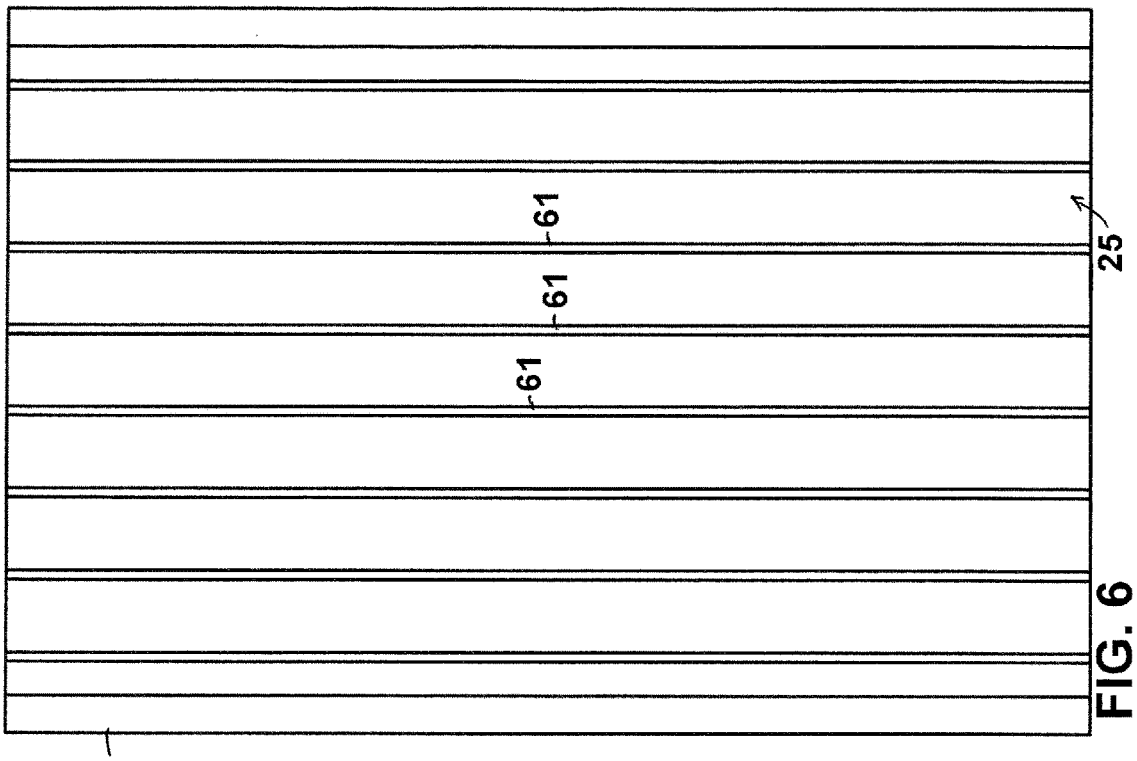
FIGS. 5 and 6 are respectively a back view and a front view of the core with the front convector structure attached to it.

The rear panel 4 may be formed from sheet metal, e.g. sheet aluminium, and is locally indented to define a plurality of recesses 43 which are spaced apart in two (respectively, vertical and horizontal) dimensions to form a spaced array on the first side 40 of the panel. The opposite, first and second sides 40, 41 of the rear panel 4 may be generally flat in the regions between the recesses 43 to extend in parallel with the convection plane P1, hence defining a flat surface 47 on its second side 41 in-between the second protrusions 44. The two dimensions defining the spaced array extend in the major plane of the panel 4 and parallel with the convection plane P1, hence in the plane of the drawing as shown in FIG. 3.

Each recess 43 extends along a recess axis X1 towards the first outward side 23 of the core to define a second protrusion 44 on the second side 41 of the panel. Each recess has a recess sidewall 45 and a recess base wall 46, the recess sidewall 45 surrounding the recess axis X1 and extending towards the first outward side 23 of the core and terminating at the recess base wall 46 as best seen in FIGS. 11, 12 and 13. Each recess sidewall 45 may define a frustoconical surface of revolution about the respective recess axis X1 as shown. A perforation 48 is formed, conveniently as a circular hole as shown, in each recess base wall 46 so that it extends along the recess axis X1 between the first and second sides 40, 41 of the panel 4.

The core 20 is arranged in the casing 2 as shown so that each recess base wall 46 is spaced apart from the first outward side 23 of the core by a separation distance D1 (FIG. 12).

The flat surfaces 47 and 27' (being respectively the flat surface 47 of the second side 41 of the rear panel 4 in-between the second protrusions 44, and the flat surface 27' of the outward side 23 of the rear panel 27 in-between the first protrusions 26) are spaced apart in opposed relation on opposite sides of a nominal convection plane P1 (FIG. 12) lying in a convection space 50 between the rear panel 4 and the core 20. In the installed position of the heater the convection plane P1 is vertical and parallel with the wall 12 (FIG. 11).

When the first and second protrusions 26, 44 are projected onto the convection plane P1, the first protrusions 26 are arranged in-between the second protrusions 44 in the convection plane P1 so that the convection space 50 defines a serpentine flowpath between respective adjacent ones of the first and second protrusions 26, 44.

Advantageously as shown, the first and second protrusions 26, 44 may intersect the convection plane. This improves the effectiveness of the serpentine flowpath so that air cannot flow in a straight line in the convection plane P1 between the first and second protrusions, but rather is diverted around each protrusion.

Figure 7:
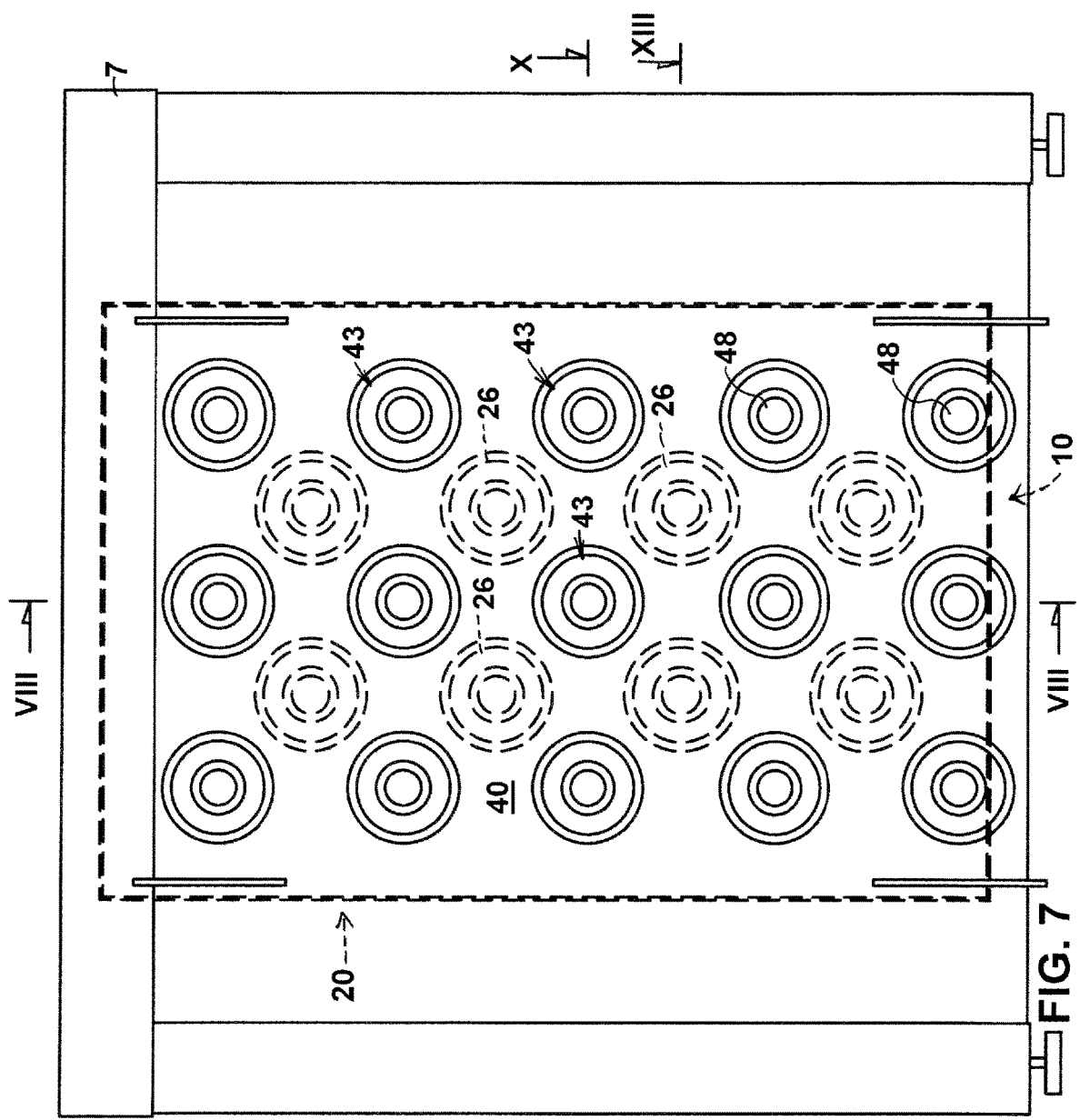
FIG. 7 is a rear view of the heater showing the core in its installed position inside the casing.
Figure 8:
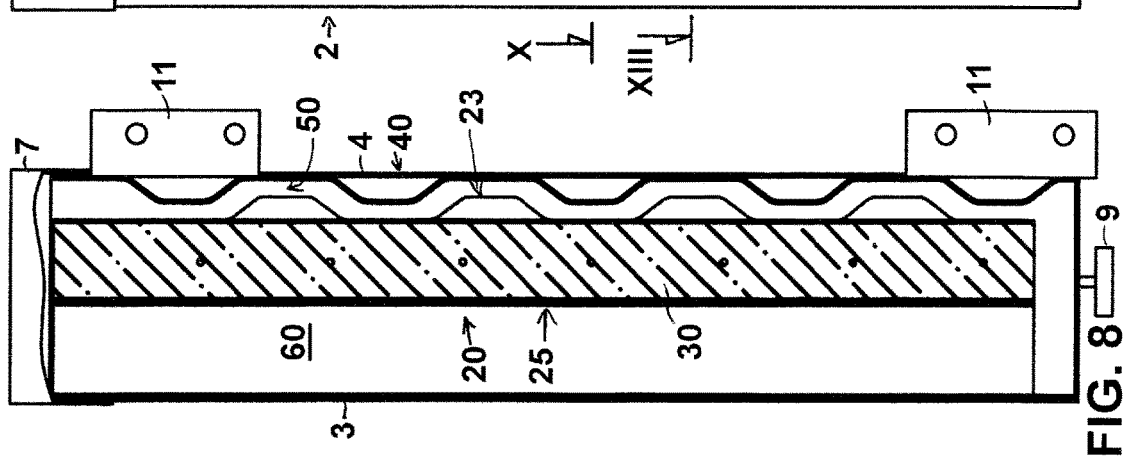
FIG. 8 is a vertical section through the heater at VIII-VIII of FIGS. 7 and 10.

The projected positions of the first and second protrusions can be seen in FIG. 12 which shows how both sets of protrusions intersect the convection plane P1; if in alternative embodiments the protrusions 26, 44 are arranged entirely on opposite sides of the nominal convection plane P1 they can nevertheless be projected onto the convection plane plane in a direction normal to the convection plane, so that when viewed in the convection plane the two sets of first and second projections 26, 44 can be seen to be arranged in-between one another as shown in FIG. 7.

It can be seen that the respective surfaces 47, 27' of the second side 41 of the panel and the outward side 23 of the core are spaced apart by a distance D2 in opposed relation on opposite sides of the convection plane P1.

Figure 9:
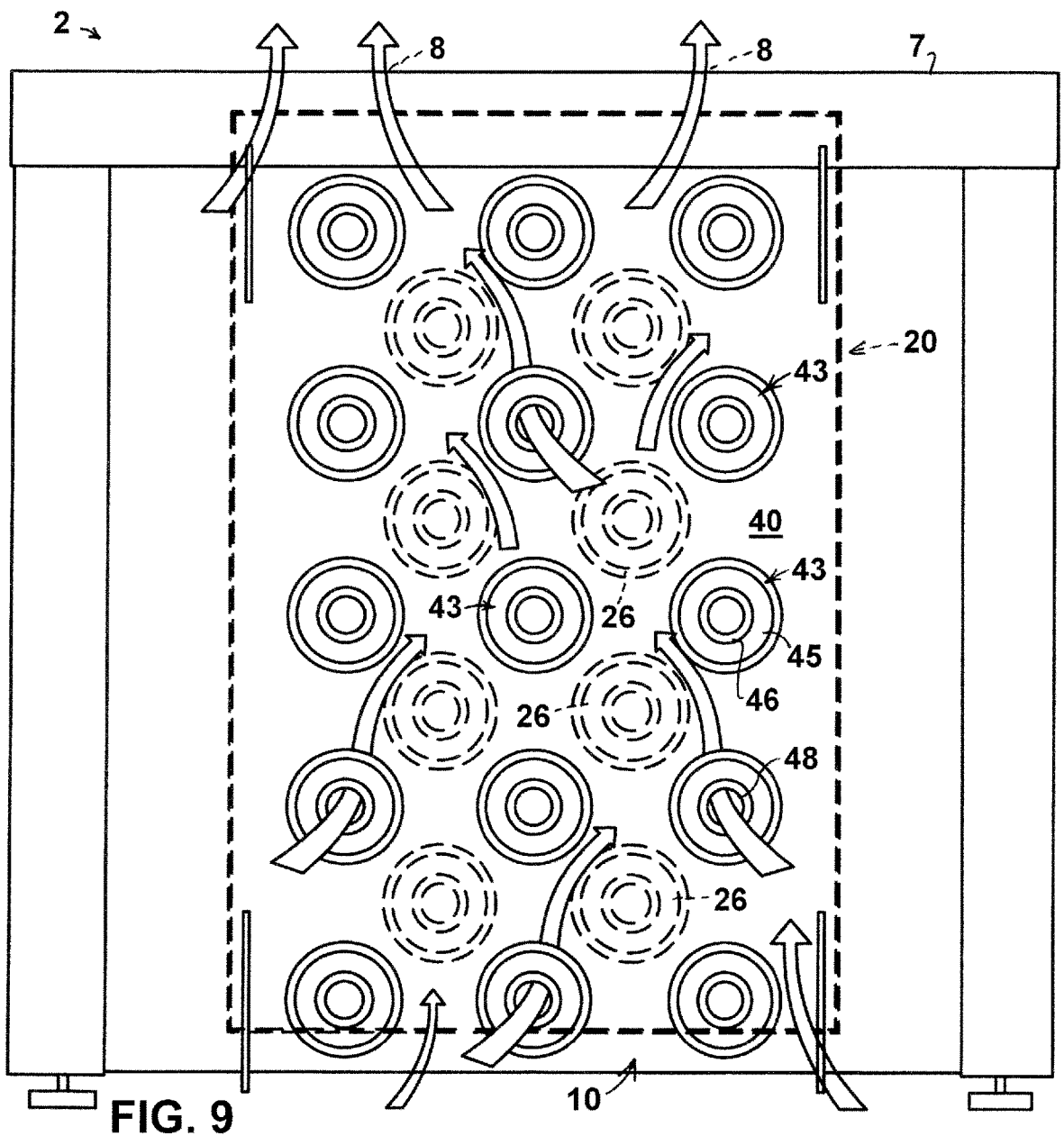
FIG. 9 is another rear view of the heater and core showing how air is drawn in through the perforations.
Figure 10:
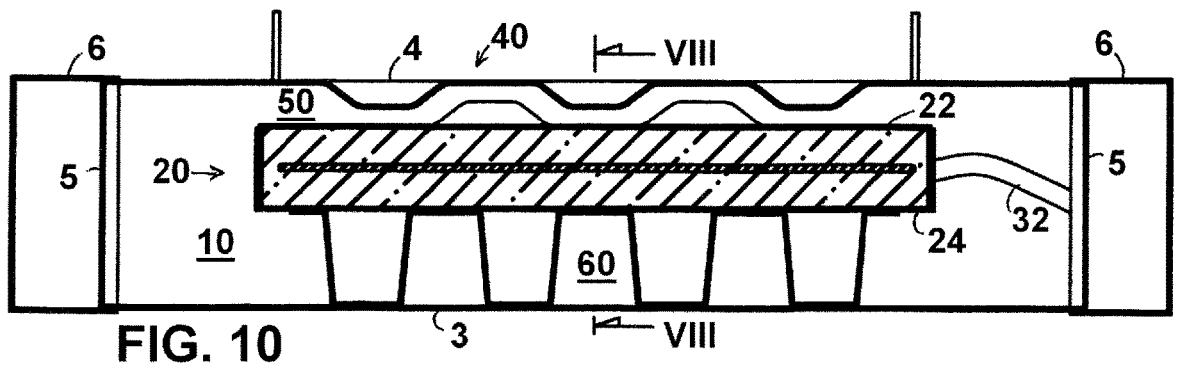
FIG. 10 is a horizontal section at X-X of FIG. 7.

In use, air is drawn into the convection space 50 via the opening 10 at the base of the casing 2, travelling up through the convection space to exit via the air vents 8 in the top cover 7, as shown in FIGS. 9 and 11. The differential velocity of the upwardly flowing air relative to the still air in the region between the rear panel 4 and the wall 12 creates a pressure differential, the restricted region of the convection space adjacent each perforation functioning in the manner of a Venturi or eductor to draw air in through the perforations 48 to increase the mass flow rate of the air inside the convection space 50.

Although the invention is not bound by theory, it is believed that the serpentine flowpath may increase thermal transfer by causing the air to impinge on the first protrusions 26 and by increasing the length of the flowpath and hence the residence time of the air within the convection space 50. Moreover, as air is drawn in through the perforations into the convection space 50 as shown in FIGS. 9 and 11, the mass flow rate may increase progressively towards the top of the convection space 50 and so velocity may also increase, which in turn accentuates the pressure differential driving more air into the convection space towards the upper end of the structure. The novel structure thus generates a surprisingly effective convective airflow in a very slim space with a maximum thickness dimension D2.

A relatively small separation distance D1 increases the differential velocity of the airflow so that more effective convective heat transfer is obtained in a slim form factor. Advantageously therefore, and as shown, D1 may be less than D2. Optionally, also as shown, D1 may be less than 0.5·D2. For example, D1 may be about 0.4·D2 as shown, or about 0.3·D2, or even less. By way of example, in some embodiments the distance D1 may be in the range from about 5 mm to about 15 mm, for example, about 1 cm.

In the illustrated embodiment, the front panel 3 of the casing 2 is spaced apart from the core 20 to define a front convector space 60 between the front panel 3 and the core 20. A convector structure is arranged in the front convector space 60, the convector structure comprising a plurality of walls 61 extending between the second, frontwardly facing outward side 25 of the core and the front panel 3 of the casing, the walls 61 being spaced apart to divide the front convector space into a plurality of channels 62. Although in the illustrated embodiment the walls 61 are separate from the front panel 3, they could be incorporated into the front panel 3 so that the front panel 3 has a visible structure of vertical joints. Of course, other constructions are possible.

As best seen in FIG. 11, the convection space 50 may include a lower region 51 and an upper region 52, wherein in use, air heated in the lower region 51 flows upwardly into the upper region 52, and wherein the first and second protrusions extend into the lower region 51 but not the upper region 52.

When the novel heater 1 is mounted on a wall 12 with its rear surface in spaced parallel relation to the wall as shown in FIG. 11, the air drawn through the perforations 48 into the convection space 50 causes cooler air to flow upwardly from floor level and inwardly into the space between the rear surface of the heater and the wall. In tests it is found that the maximum temperature of the wall surface behind the heater 1 remains surprisingly low while the heater is in use, being only slightly higher than that measured at some horizontal distance from the heater 1. Thus, the novel heater loses very little heat to the wall.

Further advantageously, the strong convective airflow generated by the novel heater is found to reduce the surface temperature of the casing 2 to a surprisingly low temperature, so that the novel heater may be suitable for use where conventional heaters with higher surface temperatures would present a risk of injury to vulnerable users.

In tests, it is found that as little as 5% of the heat output of the novel heater may be radiated from its rear face opposite the wall, with 25% being radiated from its front face and the remaining 70% being transferred to the room by the convected air flowing from the air outlets which open at the top of the heater 1 from the rear convection space 50 and front convector space 60.

As illustrated, the recess base wall 46 is defined by an inwardly facing surface, which is to say, a surface facing towards the core 20, which may be formed (wholly or in part) by the thickness of the recess sidewall 45. The recess base wall 46 may also define a rearwardly facing surface, i.e. a surface facing away from the core 20, as shown.

In a development (not shown), the perforations 48 may be made somewhat larger than illustrated, for example, extending up to most or all of the radially inner dimension (or diameter) of the recess 43 at the recess base wall 46, in which case the recess base wall 46 may not have a rearwardly facing surface.

In a further development (not shown), the surface temperature of the front face of the heater may be further reduced by increasing the number of walls 61 to further subdivide the front convector space 60, thus strengthening the convection in the channels 62.

In a further development, the vertical (height) dimension of the upper region 52 may be somewhat greater than illustrated. For example, the upper region 52 may be about 150 mm in height. The vertically elongated upper region 52 acts as a chimney which further strengthens the convective airflow through the convection space 50. In such arrangements, further perforations (not shown) may be provided in the rear panel 4 opening into the upper region 52 of the convection space 50. This further increases the airflow drawn into the convection space 50 from the space between the heater 1 and the wall 12.

When these features are provided in combination it is found that the maximum wall surface temperature behind the heater 1 may be as little as 0.5° C. higher than that measured at a horizontal distance of 1.5 m away from the heater 1.

In summary, a wall mountable electric heater comprises a core 20 arranged in a casing 2 with a convection space 50 defined between opposed surfaces 47, 27' of the casing and the core. The opposed surfaces are provided with oppositely directed protrusions 26, 44 which are spaced apart in two dimensions and arranged in-between one another to form a serpentine flowpath. The protrusions 44 in the panel 4 of the casing define recesses 43 which extend inwardly towards the core, each recess having a base wall 46 in which a perforation 48 is formed between the first and second sides 40, 41 of the panel 4. The air flowing upwardly through the convection space 50 generates a pressure differential across the first and second sides 40, 41 of the panel 4, drawing air in through the perforations 48 to increase the mass flow rate of the air in the convection space. The base wall 46 of each recess may be spaced apart from the opposed, outwardly facing side 23 of the core by a relatively small distance D1, increasing the velocity of the airflow and hence the pressure differential proximate the perforation 48.

In alternative embodiments, the panel defining the recesses may be arranged other than at the rear surface of the casing, Instead of a conventional front convector structure as shown, two panels defining recesses and protrusions might be arranged, one in front and one behind the core, with the frontwardly facing side of the core also defining an array of protrusions similar to the first protrusions, to define two parallel convection spaces, each having a slim thickness dimension D2 as described above, to further reduce the overall thickness of the heater. The first protrusions and the recesses defining the second protrusions could be formed by pressing, moulding or any other suitable process. The recesses and first and second protrusions could be other than frustoconical. If desired, the thermal mass could be pressed, moulded, cut or otherwise formed to define the first protrusions. The surface of the thermal mass could be exposed at the convection space without the use of a sheet metal casing. The thermal mass could be a solid or liquid material. The overall form factor of the heater can be selected to suit the intended use position, being relatively taller and narrower or shorter and wider than that illustrated.

Many further adaptations are possible within the scope of the claims.

In the claims, reference numerals and characters in parentheses are provided purely for ease of reference and should not be construed as limiting features.

The invention claimed is:

1. A wall mountable electric heater (1) comprising a casing (2) and a core (20) arranged in the casing (2);

the casing (2) including a panel (4), the panel (4) having opposite, first and second sides (40, 41);

the core (20) including a first outward side (23), a thermal mass (30), and an electric element (31) arranged to heat the thermal mass (30);

respective surfaces (47, 27') of the second side (41) of the panel (4) and the first outward side (23) of the core (20) being spaced apart in opposed relation on opposite sides of a nominal convection plane (P1) lying in a convection space (50) between the panel (4) and the core (20);

the first outward side (23) of the core (20) having a plurality of first protrusions (26), the first protrusions (26) being spaced apart in two dimensions to form a spaced array;

the panel (4) having a plurality of recesses (43), the recesses (43) being spaced apart in two dimensions to form a spaced array on the first side (40) of the panel (4);

each recess (43) extending along a recess axis (X1) towards the first outward side (23) of the core (20) to define a second protrusion (44) on the second side (41) of the panel (4);

each recess (43) having a recess sidewall (45) and a recess base wall (46), the recess sidewall (45) surrounding the recess axis (X1) and extending towards the first outward side (23) of the core (20) and terminating at the recess base wall (46), the recess base wall (46) being spaced apart from the first outward side (23) of the core (20) by a separation distance D1;

wherein, when the first and second protrusions (26, 44) are projected onto the convection plane (P1), the first protrusions (26) are arranged in-between the second protrusions (44) in the convection plane (P1) so that the convection space (50) defines a serpentine flowpath between respective adjacent ones of the first and second protrusions (26, 44);

and a perforation (48) is formed in each recess base wall (46) between the first and second sides (40, 41) of the panel (4).

2. A wall mountable electric heater (1) according to claim 1, wherein the first and second protrusions (26, 44) intersect the convection plane (P1).

3. A wall mountable electric heater (1) according to claim 1, wherein said respective surfaces (47, 27') of the second side (41) of the panel (4) and the first outward side (23) of the core (20) are spaced apart by a distance D2 in opposed relation on opposite sides of the convection plane (P1); and D1<D2.

4. A wall mountable electric heater (1) according to claim 3, wherein D1<0.5·D2.

5. A wall mountable electric heater (1) according to claim 1, wherein each recess sidewall (45) defines a frustoconical surface of revolution about the respective recess axis (X1).

6. A wall mountable electric heater (1) according to claim 1, wherein the panel (4) defines a rear surface of the casing (2), and the heater (1) comprises supports (11) for supporting the heater (1) on a wall (12) with the rear surface in spaced parallel relation to the wall (12).

7. A wall mountable electric heater (1) according to claim 6, wherein the core (20) has a second outward side (25) opposite the first outward side (23), and the casing (2) includes a front panel (3), the front panel (3) defining a front side of the heater (1) and being spaced apart from the core (20) to define a front convector space (60) between the front panel (3) and the core (20); and a convector structure is arranged in the front convector space (60), the convector structure comprising a plurality of walls (61) extending between the second outward side (25) of the core (20) and the front panel (3) of the casing (2), the walls (61) being spaced apart to divide the front convector space (60) into a plurality of channels (62).

8. A wall mountable electric heater (1) according to claim 1, wherein the core (20) includes a sheet metal casing (21), the first protrusions (26) comprising locally indented regions of a sheet metal panel (27) of the sheet metal casing (21);

the thermal mass (30) being arranged in the sheet metal casing (21) in contact with regions of the sheet metal panel (27) proximate the first protrusions (26), a void (33) being formed between the thermal mass (30) and each of the first protrusions (26).

9. A wall mountable electric heater (1) according to claim 8, wherein the thermal mass (30) comprises a compressed mineral powder.

* * * * *